Sept. 22, 1931.  I. N. BEALL  1,824,458
METHOD FOR ABSORPTION OF VAPORS AND LIQUIDS
Filed Jan. 13, 1928
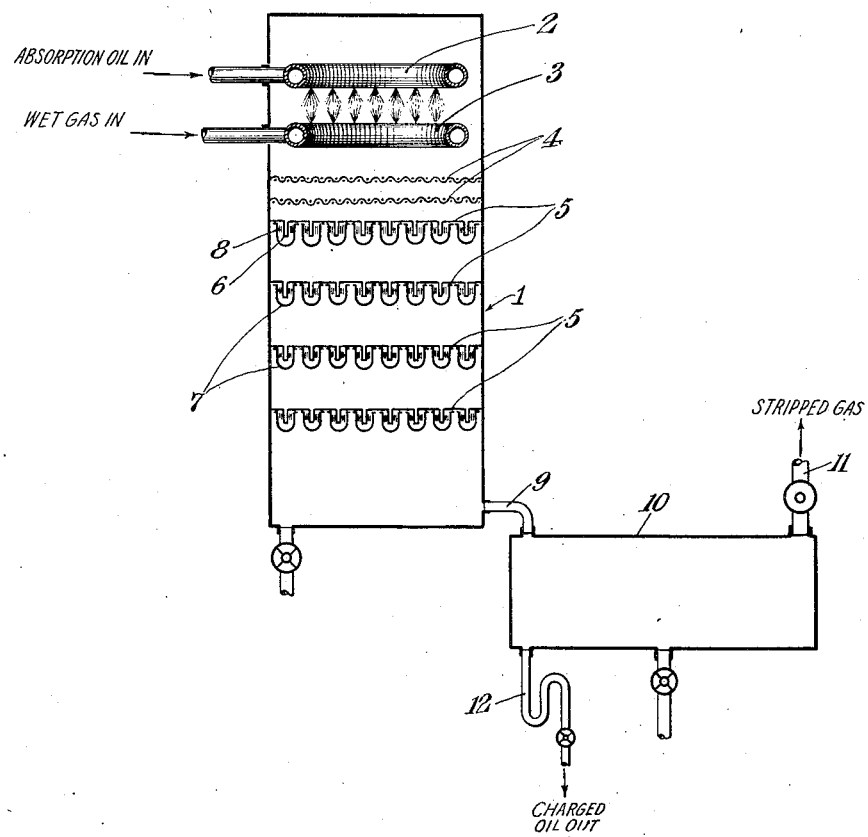
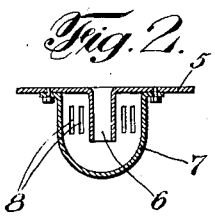
INVENTOR.
Isaac N. Beall
BY Kenyon Kenyon
ATTORNEYS.

Patented Sept. 22, 1931

1,824,458

UNITED STATES PATENT OFFICE

ISAAC N. BEALL, OF EASTLAND, TEXAS, ASSIGNOR, BY MESNE ASSIGNMENTS, TO RESEARCH PROCESS COMPANY, A CORPORATION OF DELAWARE

METHOD FOR ABSORPTION OF VAPORS AND LIQUIDS

Application filed January 13, 1928. Serial No. 246,602.

This invention relates to the absorption of vapors and gases and liquids; and it is of particular value in the absorption in the liquid of mixtures of vapors and gases having different properties.

In the absorption of vapors and gases in liquids conditions of temperature and pressure are important and it is also important to obtain intimate contact between the liquid and the vapors and gases that are to be absorbed. Moreover the conditions with respect to vapor tension are important in the absorbing operation.

An object of my invention is to provide a method which is simple and readily operated but highly efficient in the absorption of vapors and gases and liquids. Other and further objects of my invention will be apparent from the following further description thereof. Many difficulties and important requirements of absorption operations are found in the absorption of desired hydrocarbons from natural gas, and with a view to assisting in the understanding of my invention, but with the understanding that my invention is not limited thereto, I will describe my invention particularly in connection with such an operation; although my invention possesses particular advantages in connection with and is especially applicable to the absorption of desired hydrocarbons from natural gas.

The vapors and gases that are to be absorbed in a liquid frequently constitute a mixture of vapors and gases of different characteristics. It may be desired to absorb the constituents of the mixture equally, or it may be desired to absorb more of some constituents than of other constituents, and sometimes it is desirable to carry out a selective absorption as accurately as possible. Some constituents of the mixture may be more readily absorbed than other constituents. Moreover, vapors or gases that have been absorbed may be displaced by improper contact of the charged absorption liquid with unabsorbed vapors and gases, such displacement being brought about by an action somewhat analogous to the action of inert gases in a distilling operation. The effect of the use of gas in a distilling operation is well known and is believed to depend on the relative vapor tensions of the different substances under the existing conditions and upon the velocity of gas employed.

Several of the conditions above described exist in connection with the absorption of desired hydrocarbons from natural gas. It is common practice to pass absorption oil in contact with and counter-current to a stream of natural gas. The natural gas is a mixture of vapors and gases of hydrocarbons of different boiling points, the constituents of higher boiling points being more readily absorbed by the oil. But passage of absorption oil counter-current to the gas does not result in absorption of all of the desired heavier constituents of the gas, as shown by the fact that the residual gas contains quantities of such constituents. However, agitation of natural gas with absorption oil in a bottle results in substantially complete absorption of heavier constituents of the gas and extensive absorption of the intermediate and lighter constituents of the gas. Moreover actual test shows that with counter-current flow in a bubble-cap absorber the oil containing the maximum percentage of recoverable hydrocarbons is, contrary to expectation, not found at the outlet or bottom of the absorber but is found on an intermediate plate thereof. The point at which the oil has absorbed its maximum quantity of recoverable hydrocarbons being intermediate the point at which the gas and oil come together and the point at which they are separated in counter-current absorption, it appears that as the oil advances from that intermediate point toward its outlet while in contact with incoming gas it gives up some hydrocarbons which it had once absorbed. Also, counter-current flow causes maximum relative velocity of oil and gases which promotes the redistillation of previously absorbed higher boiling constituents, and oil leaving the absorber and which should be most highly charged is in contact with the maximum quantity of gas.

In the absortption in liquid of gases and vapors in accordance with my invention these difficulties are avoided and intimate contacting of liquid with gases and vapors is obtained under any desired temperature and pressure conditions.

In the drawings in which like reference characters indicate similar parts, Fig. 1 is a vertical sectional view of apparatus embodying my invention and whereby my process may be practised; and Fig. 2 is a detail view in vertical section.

In accordance with my invention the absorption liquid and the vapors and gases to be absorbed are immediately brought into intimate contact and then they are passed along concurrently and the unabsorbed gases are then separated from the absorption liquid. Also, the residual gases and vapors are separated from the charged oil while the oil and gases and vapors are moving at decreased velocity. Furthermore, while the gases and vapors and liquid are moving along concurrently they are intimately contacted and agitation of the liquid is automatically effected. Inasmuch as the gases and vapors and liquids progress concurrently in the absorption operation the difficulty due to displacement of absorbed gases or vapors by contacting gases and vapors is avoided; and intimate contact is effected.

In the embodiment of my invention which is shown in the drawings for purposes of illustration and which is subject to modifications within the spirit of the invention, the main absorbing chamber 1 is provided with dispersing or spraying devices 2 and 3 which discharge in oposition to one another. Into one of the dispersing or spraying devices the absorption liquid is introduced and into the other such device is introduced the vapors or gases or mixture thereof that is to be absorbed. Inasmuch as the dispersing or spraying devices discharge in opposition to one another there is an intimate contact of liquid with vapors or gases and the mixing thereof may be facilitated by placing below the spraying or dispersing devices one or more screen partitions 4 of any suitable construction. Below the screens there is a succession of partitions 5, each of which is provided with downwardly extending open tubes 6. Each tube is surrounded by a cap 7 that is preferably provided with relatively narrow slots 8 extending upwardly in the side walls of the cap 7 from a point above the lower end of the tubes 6 in order that the tubes will normally be sealed. Obviously the liquids and vapors and gases may be passed through the absorption chamber 1 under any temperature and pressure conditions desired. The downward flow of liquids and gases and vapors causes the vapors and gases to bubble through the liquid in the lower part of each cap 7 and the liquid and vapors and gases pass together through the slots 8 and there is a dispersing or atomizing of the liquid as it passes through the slots 8 and falls to the next succeeding partition 5. In this manner agitation and intimate contact are automatically effected during the passage of the substances downwardly through the absorber together. The mixture of the liquid and unabsorbed vapors and gases is preferably passed as by pipe 9 to an elongated separator 10 from which the stripped gas is discharged through outlet 11 while the charged liquid passes out through pipe 12. The withdrawal of liquid through pipe 12 is so carried out, as by trapping pipe 12, that gases do not pass out with the charged absorption liquid.

It will be apparent from the foregoing that my method for absorbing vapors and gases and liquids is of general application although it is particularly adapted to the absorption of mixtures of hydrocarbons from natural gas or mixtures of vapors and gases occurring in petroleum refining or destructive distillation of carbonaceous matter.

I claim:

1. In the absorption of gasoline hydrocarbons comprising a mixture of hydrocarbons of different boiling points from natural gas the process comprising bringing natural gas and an absorption liquid into contact and flowing the gas and liquid along concurrently in contact while collecting pools of the liquid and causing the gas to bubble through the liquid of said pools and dispersing the liquid in contact with the gas, and separating charged liquid from residual gas.

2. In the absorption of gases or vapors in liquid the process comprising bringing the gases or vapors into contact with an absorption liquid and flowing the gases or vapors and liquid in contact concurrently while causing the gases or vapors to bubble upwardly through pools of the liquid and dispersing the liquid in contact with the gases or vapors, and then separating charged liquid from residual gas.

3. In the absorption in a liquid of vapors or gases of substances having different boiling points the process comprising bringing the vapors or gases into contact with an absorption liquid and flowing the vapors or gases and liquid concurrently in contact toward a point of separation while causing the gases or vapors to bubble upwardly through the liquid and the liquid to be dispersed within the gas by said concurrent flow, and then separating charged liquid from residual gas.

4. In the absorption in a liquid of vapors or gases of substances having different boiling points, the process comprising bringing the gas containing its most readily absorable constituents into contact with the liquid while it is substantially free of absorbed constituents of the gas, flowing the gas and liquid concurrently toward a point of separation, causing the gas to bubble through collected bodies of the liquid during the flow thereof in contact, and separating residual gas from the charged liquid at said point of separation.

5. In the absorption in a liquid of vapors or gases of substances having different boiling points, the steps comprising bringing the gas into contact with the liquid, flowing the gas and liquid concurrently toward a point of separation, during such concurrent flow forming a body of liquid and conducting the gas below the surface of the liquid of said body and releasing it to bubble therethrough, and separating residual gas from charged liquid at said point of separation.

6. In the absorption in a liquid of vapors or gases of substances having different boiling points, bringing the gas into contact with the liquid, flowing the gas and liquid concurrently, during the concurrent flow of the gas and liquid maintaining a seal with the liquid to the flow of gas and thereby causing the gas to bubble through the liquid during the concurrent flow thereof.

7. In the absorption in a liquid of vapors or gases of substances having different boiling points, bringing the gas into contact with the liquid, flowing the gas and liquid concurrently, and during the concurrent flow of the gas and the liquid alternately dispersing the liquid in the gas and dispersing the gas in the liquid.

8. In the absorption of a liquid of vapors or gases of substances having different boiling points, bringing the gas into contact with the liquid, flowing the gas and liquid concurrently, during the concurrent flow of the gas and liquid alternately dispersing the liquid in contact with the gas and collecting the liquid, and bubbling the gas through the collected liquid.

9. In the absorption in a liquid of vapors or gases of substances having different boiling points, bringing the gas into contact with the liquid, flowing the gas and liquid concurrently, during the concurrent flow of the gas and liquid alternately dispersing and collecting the liquid, and sealing the flow of gas with collected liquid and thereby causing the gas to bubble through the liquid.

10. In the absorption in a liquid of vapors or gases of substances having different boiling points, the steps comprising bringing the gas into contact with the liquid, flowing the gas and liquid concurrently downward, collecting a body of the downwardly flowing liquid and causing the downwardly flowing gas to bubble therethrough.

11. In the absorption in a liquid of vapors and gases, the steps comprising bringing the liquid and gas into contact, flowing the gas and liquid concurrently, dividing the flowing mixture into a plurality of streams, and collecting the liquid flowing in each stream and bubbling the gas in each stream through the collected liquid.

In testimony whereof, I have signed my name to this specification.

ISAAC N. BEALL.